(12) United States Patent
Good

(10) Patent No.: US 11,018,491 B2
(45) Date of Patent: May 25, 2021

(54) SYSTEM FOR FIELD REPLACEABLE SURGE PROTECTION

(71) Applicant: NEXANS, Courbevoie (FR)

(72) Inventor: Paul Michael Good, New Holland, PA (US)

(73) Assignee: BERK-TEK LLC, New Holland, PA (US)

(*) Notice: Subject to any disclaimer, the term of this patent is extended or adjusted under 35 U.S.C. 154(b) by 169 days.

(21) Appl. No.: 16/236,558

(22) Filed: Dec. 30, 2018

(65) Prior Publication Data

US 2020/0212665 A1 Jul. 2, 2020

(51) Int. Cl.
*H02H 3/00* (2006.01)
*H02H 3/05* (2006.01)
*H02H 3/20* (2006.01)
*H04L 12/10* (2006.01)

(52) U.S. Cl.
CPC ............... *H02H 3/05* (2013.01); *H02H 3/20* (2013.01); *H04L 12/10* (2013.01)

(58) Field of Classification Search
None
See application file for complete search history.

(56) References Cited

U.S. PATENT DOCUMENTS

| 6,980,725 B1* | 12/2005 | Swieconek | G02B 6/4452 |
| | | | 385/135 |
| 7,660,409 B1* | 2/2010 | Czerwiec | H04M 1/003 |
| | | | 379/413.02 |
| 2008/0037188 A1 | 2/2008 | Wilson et al. | |
| 2010/0005320 A1 | 1/2010 | Squillante | |

FOREIGN PATENT DOCUMENTS

KR 101426469 8/2014

OTHER PUBLICATIONS

EU Search Report dated May 4, 2020.

* cited by examiner

*Primary Examiner* — Stephen W Jackson
(74) *Attorney, Agent, or Firm* — Sofer & Haroun, LLP

(57) ABSTRACT

A power sourcing equipment for remote powering of PoE equipment is provided including a transceiver for receiving an optical signal, a power module for receiving a power input, and a PoE device for receiving and converting the optical signal and the power input and controlling at least one remote device. A surge protector slot with a removable and field replaceable surge protector unit is provided. The removable field replaceable surge protector unit, after triggering by a surge event, is removable and replaceable with a new field replaceable surge protector unit allowing for continued surge protection without replacing the entire power sourcing equipment.

6 Claims, 5 Drawing Sheets

SYSTEM FOR FIELD REPLACEABLE SURGE PROTECTION

FIELD OF THE INVENTION

This application relates to Power over Ethernet (PoE). More particularly, the present invention relates to Power Sourcing Equipment (PSE) used within a PoE network, the PSE having field replicable surge protection.

DESCRIPTION OF RELATED ART

A technology trend known generally as Internet of Things (IoT) is exponentially increasing the number of IP-based devices connected to Ethernet networks. In one example a college campus may have multiple buildings each of which have certain IP based devices such as security cameras, emergency phones and wireless access points. FIG. 1 shows an exemplary campus arrangement needing such support. In this context IT building "8" is connected to the other buildings "1"-"7" and "9" at which remote locations there is some form of powered electrical device (e.g. security camera) which is managed at the IT building.

Many of these IP-based devices are more than 100 meters away from the network closet and therefore out of the reach of standards-based powering solutions such as what is commonly referred to as Power over Ethernet (PoE) and technically defined in the IEEE 802.3bt ("bt") standard. The bt standard defines four power system types; Type 1, Type 2, Type 3 and Type 4. These types provide 12.95 W, 25.5 W, 51 W and 71 W to end devices respectively. Each type also has a myriad of defined characteristics including voltages, currents, resistance values, etc. . . . The standard also defines certain characteristics of the equipment that provides power (Power Sourcing Equipment (PSE), the equipment that uses power (Powered Device (PD) and the cabling between the aforementioned devices. All of these systems are designed to work using category cabling at lengths of 100 m or less. This is due to the fact that the data being transmitted across the cabling at the same time as the power was designed to function at a maximum distance of 100 m.

One solution is to provide remote PSE that is powered and receives its data from a composite cable that contains both fiber optic elements and metallic conductors. If this cable is of the low voltage type, meaning that it does not need an electrician for installation, it can significantly decrease the cost of an installation. By taking advantage of the long data transmission capabilities of fiber optics and metallic conductors larger than those found in traditional category cables, the total distance between the PD and the rest of the network can be extended far beyond 100 m, to distances on the order of kilometers.

However, given the longer distances involved and use in outdoor locations, many of these devices (both PSE and actual IP-based equipment) are subject to surge events caused by lightning and other sources of electrical energy. Providing surge protected power to these PoE type IP-based devices and the connected PSEs can be quite challenging.

In some systems, transient voltage surge suppression (TVSS) is adequate for indoor and light industrial applications. However, some installations are outdoors, and otherwise outside of the zone of protection, where it is recommended that additional surge protection be installed, such as connected to the PSE devices. Many customers, designers and contractors fail to heed this advice and do not connect additional surge protection and thus lose equipment to surge damage.

Some other products on the market such as that shown in FIG. 2, have the surge protection built into the remote themselves. The downside to this is that when the surge protector does its job, the whole remote (e.g. PSE) must be replaced.

OBJECTS AND SUMMARY

The present arrangement looks to overcome the drawbacks of the prior solutions to not only provide embedded surge protection in PoE equipment, including remote PSEs, but also provides it in a field replaceable manner so that after surge events, the surge protection unit can be replaced in the PoE equipment without replacing the equipment as a whole.

To this end, the present arrangement provides for a power sourcing equipment for remote powering of PoE equipment. The PSE includes a transceiver for receiving an optical signal, a power module for receiving a power input, and a PoE device for receiving and converting the optical signal and the power input and controlling at least one remote device.

A surge protector slot with a removable and field replaceable surge protector unit is provided. The removable field replaceable surge protector unit, after triggering by a surge event, is removable and replaceable with a new field replaceable surge protector unit allowing for continued surge protection without replacing the entire power sourcing equipment.

BRIEF DESCRIPTION OF THE DRAWINGS

The present invention can be best understood through the following description and accompanying drawing, wherein.

DETAILED DESCRIPTION

Figure 3:
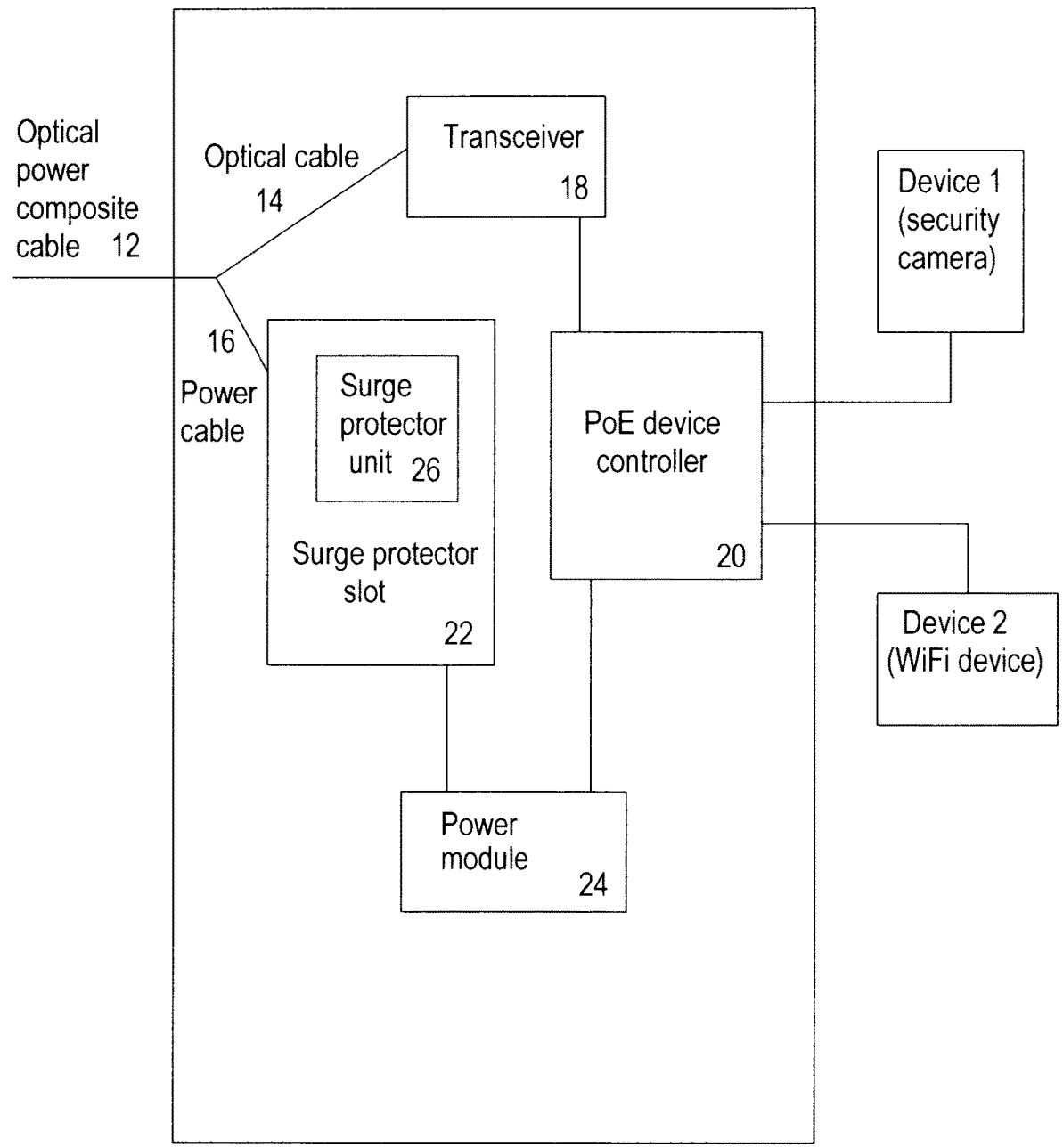
FIG. 3 is PoE supporting PSE having a field replaceable surge protection, in accordance with one embodiment.

In one embodiment as illustrated in FIG. 3, the present arrangement provides a remote PSE 10 intended to be used in a PoE type environment. In this example, PSE 10 is connected to a composite optical/power cable 12 supporting both optical fibers 14 and power wires 16. Optical fibers are routed to a transceiver 18 for receiving the optical signals and re-formatting to a copper wire signal for transmission through to the PoE device controller 20.

Figure 1:
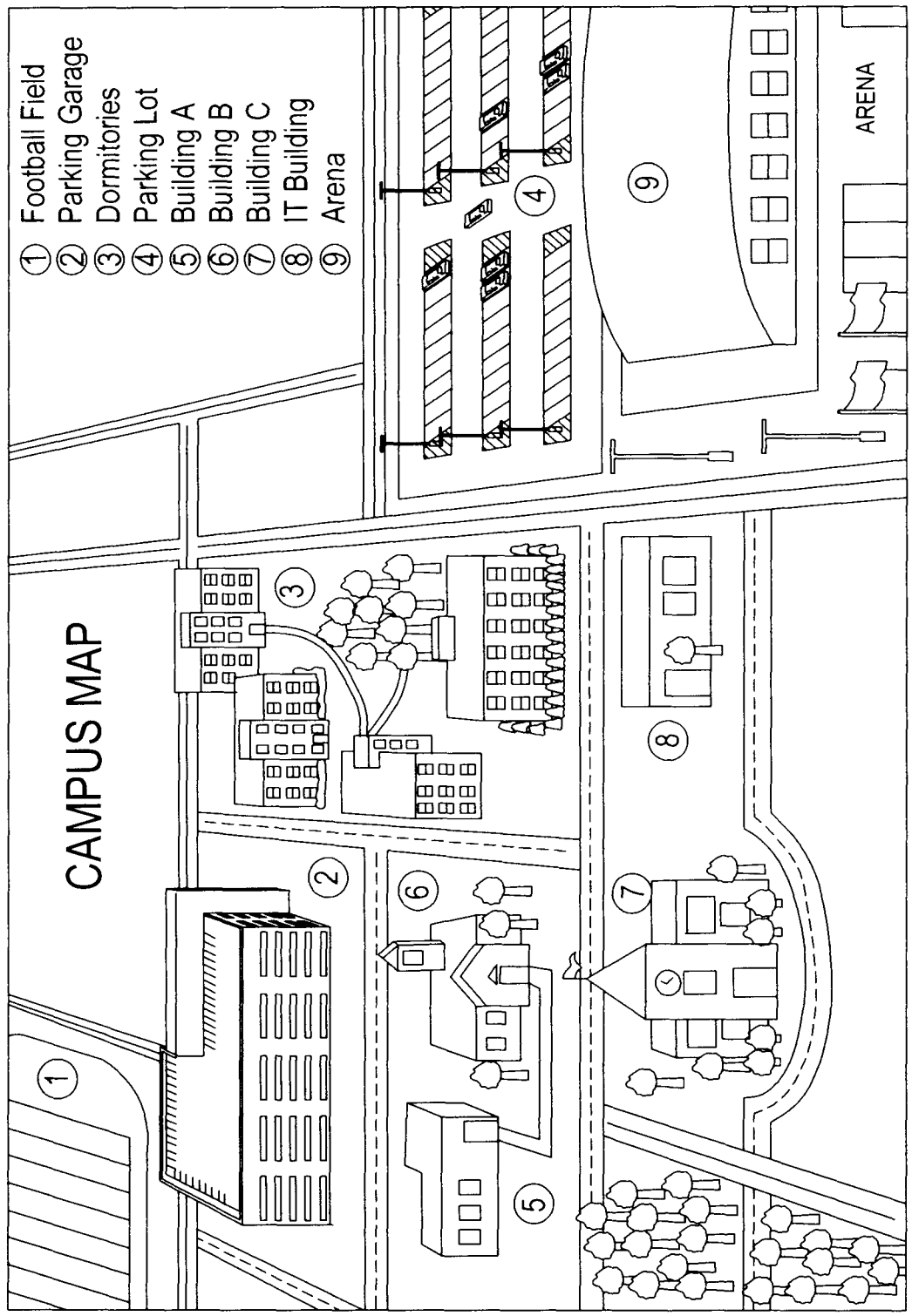
FIG. 1 shows a typical arrangement of remotely located IP based devices on a network that can be supported by a PoE type environment.
Figure 2:
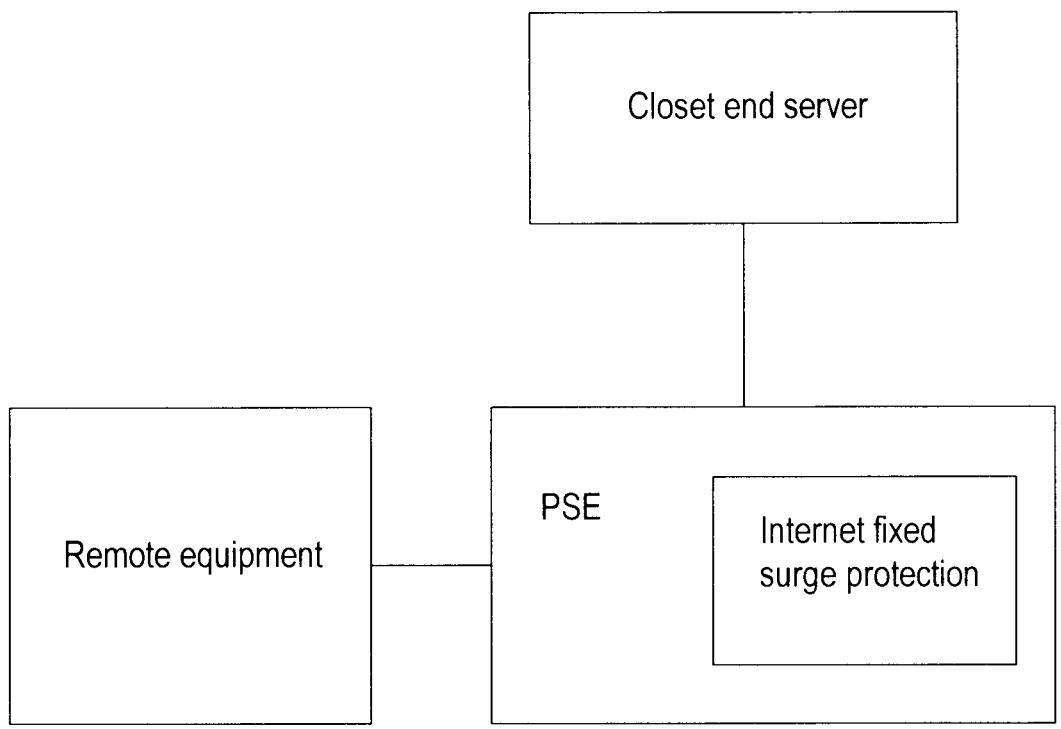
FIG. 2 is a prior art PoE connectivity with a PSE having prior art embedded surge protection.

Power component 16 of composite cable 12 is directed to a surge protection slot 22 and then to power module 24. Unlike the prior art, surge protection slot 22 is not embedded within PoE device controller 20 or in power module 24, but instead is isolated from both in an independent hardwired slot 22 with a removable and replicable surge protection unit 26. In the case of a surge event on the composite cable 12, the surge would enter PSE 10 and be collected and discharged by protection unit 26 in slot 22 prior to damaging either power module 24 or PoE device 20. Thereafter the operator may remove the used surge protection unit 26 and replace it in-field with a new surge protection unit 26 without replace either one of PoE controller 20 or power module 24 (or PSE 10 as a whole). This is a significant improvement over prior art systems with embedded surge protection like that shown in FIG. 2.

It is understood that surge protection unit 26 may be any one of a silicon avalanche suppressor diode (SASD), a metal oxide varsitor (MOV), filters, gas tubes or combinations thereof depending on the desired level of protection, cost and PSE application (and likely types of surge events to be experienced).

Figure 4:
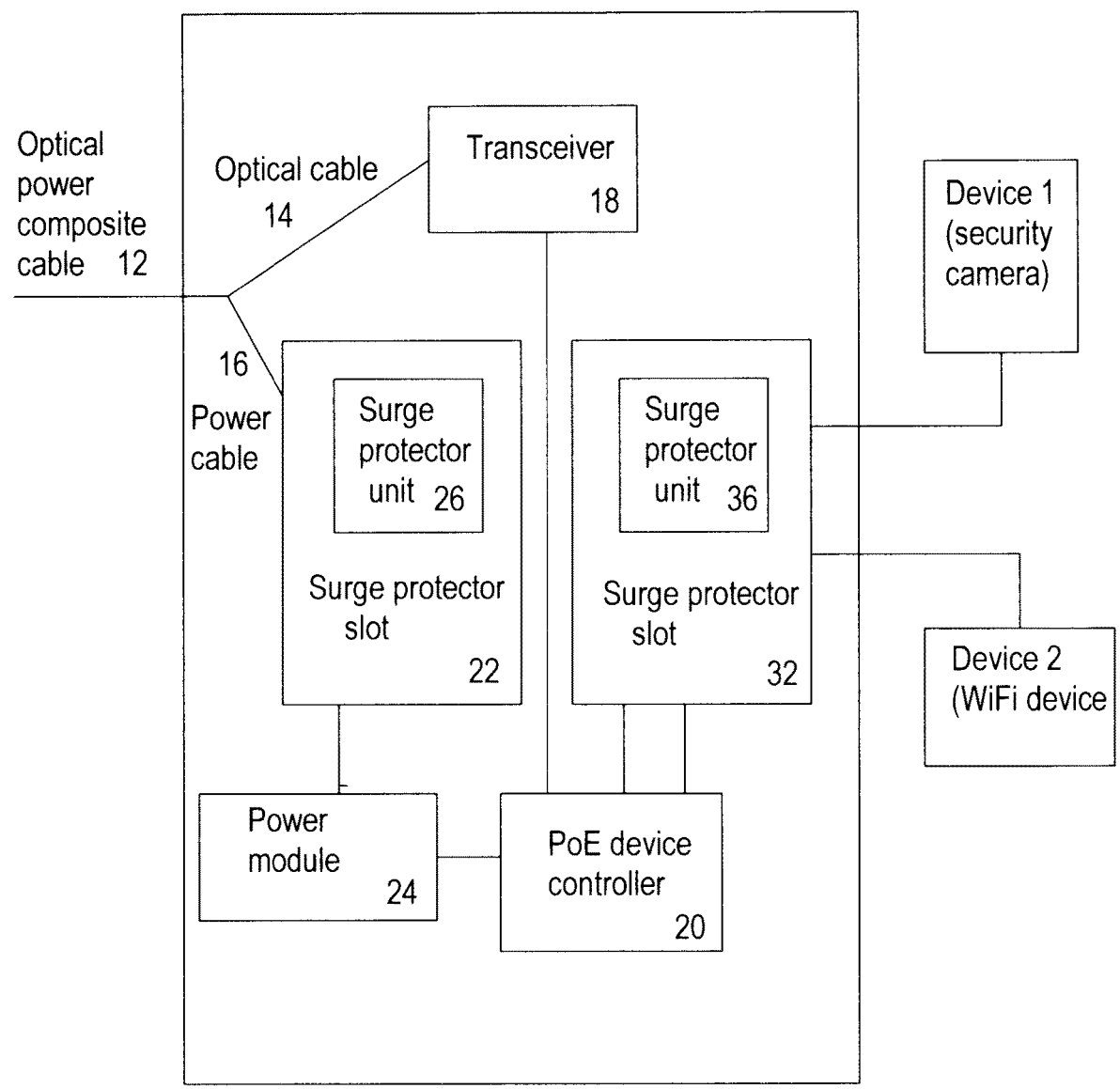
FIG. 4 is PoE supporting PSE having a field replaceable surge protection, in accordance with one embodiment.

In another embodiment shown in FIG. 4, everything is essentially the same as shown in FIG. 3 except that a second surge protection unit 36 is included in a separate surge protection slot 32 located between remove devices and PoE controller 20 so as to protect PoE controller 20 from surge events emanating from the remote devices side of PSE 10 (as opposed to those emanating from composite cable 12). Surge protection unit 36 and surge protection slot 32 are essentially the same as unit 26 and slot 22 except that the surge protection levels may be different depending on the intended level of protection as determined by the system architect.

Figure 5:
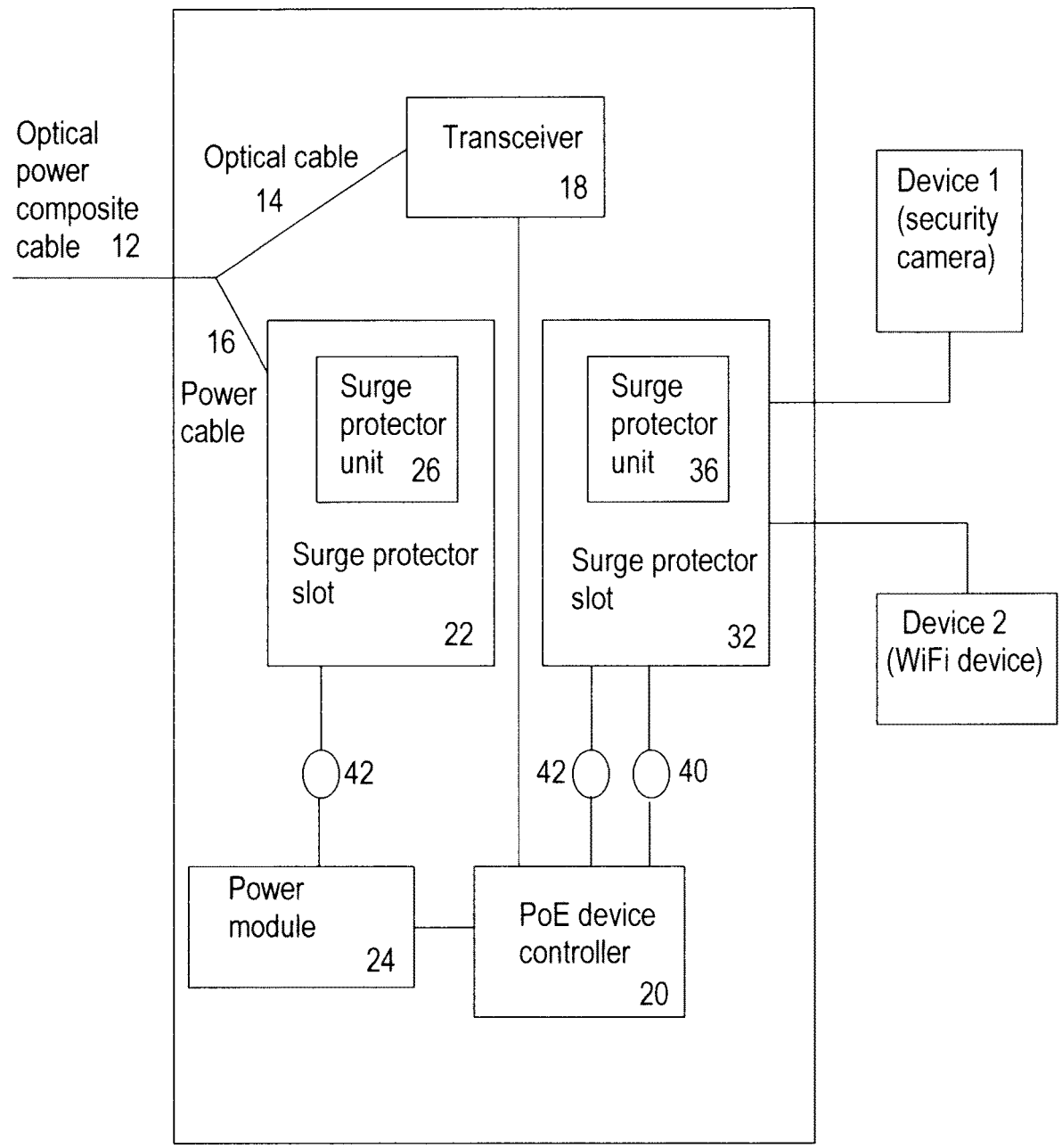
FIG. 5 is PoE supporting PSE having a field replaceable surge protection, in accordance with one embodiment.

In another embodiment shown in FIG. 5, an additional length of conductor 40 is included between surge protection units/slots 26/22, 36/32 and their protected devices, namely power module 24 and PoE device controller 20 respectively. It is noted that this embodiment of additional conductor 40 may also be implemented in the arrangement of FIG. 3 (i.e. solely between slot 22 and power module 24).

Additional conductor 40 may be in the form of a length of electrical conductor between internal power supply 24 of PSE 10 and surge protection slot 22. This arrangement provides additional 'time' for the surge components to work before the surge reaches connected component (i.e. power module 24 and PoE device 20). In one embodiment, additional conductor length 40 is about three (3) feet or longer. In one example, a typical PSE 10 is a square box with the circuit boards (components) inside with all of the circuitry and components for performing all of the functions such as those described above. Additional conductor 40 could be wrapped around the inside perimeter of the box or wrapped around a cylinder or be wound into a coil. The diameter of additional conductor 40 could be any wire size, but the smaller it is, the more DC resistance it induces. In other arrangements, the tradeoff of using a smaller additional conductor 40 is that it takes up less space inside the PSE 10 box.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system in a PoE type environment, said system comprising:
   a Power Sourcing Equipment (PSE) configured to remotely power PoE equipment, said PSE receiving data and comprising:
   a power module configured to receive a power input;
   a PoE device controller configured to:
   receive and convert said power input; and
   control at least one remote device; and
   a removable and field replaceable surge protector unit and a surge protector slot, wherein the surge protector slot is configured to receive the removable and field replaceable surge protector unit;
   wherein said removable field replaceable surge protector unit is configured to be removable and replaceable with a new field replaceable surge protector unit, and
   wherein said PSE comprises a transceiver configured to receive said data, and,
   wherein said system further comprises a composite optical/power cable comprising an optical component and a power component, said composite optical/power cable being connected to said PSE such that said PoE device controller is configured to receive said data from said optical component through said transceiver and said power module is configured to receive power input from said power component through said removable and field replaceable surge protector unit.

2. The system as claimed in claim 1, wherein said PSE further comprises a second removable and field replaceable surge protector unit and a second surge protector slot, wherein the second surge protector slot is configured to receive the second removable and field replaceable surge protector unit.

3. The system as claimed in claim 2, wherein said second surge protector slot is located between said PoE device controller and said remote device.

4. The system as claimed in claim 1, wherein said removable field replaceable surge protector unit includes surge protection equipment, wherein said surge protection equipment is at least one selected from the group consisting of:
   silicon avalanche suppressor diode (SASD), metal oxide varsitor (MOV), filters, or gas tubes.

5. The system as claimed in claim 1, wherein the PSE further comprises a length of conductor of at least 3 feet, between said surge protector slot and said power module.

6. The system as claimed in claim 3, wherein the PSE further comprises a length of conductor of at least 3 feet, between said second surge protector slot and said PoE device controller.

* * * * *